US012761976B2

(12) United States Patent
Arunachalam et al.

(10) Patent No.: US 12,761,976 B2
(45) Date of Patent: Oct. 13, 2026

(54) STATEFULSETS GRACEFUL TERMINATION FOR CLOUD COMPUTING PLATFORMS

(71) Applicant: Oracle International Corporation, Redwood Shores, CA (US)

(72) Inventors: Chandrashekar Arunachalam, Karnataka (IN); David Edward DiFranco, Chesterfield, MO (US)

(73) Assignee: Oracle International Corporation, Redwood Shores (CA)

(*) Notice: Subject to any disclaimer, the term of this patent is extended or adjusted under 35 U.S.C. 154(b) by 355 days.

(21) Appl. No.: 18/542,335

(22) Filed: Dec. 15, 2023

(65) Prior Publication Data

US 2025/0077301 A1 Mar. 6, 2025

Related U.S. Application Data

(60) Provisional application No. 63/579,683, filed on Aug. 30, 2023.

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45562* (2013.01)

(58) Field of Classification Search
CPC ............... G06F 9/5077; G06F 9/45558; G06F 2009/45562
See application file for complete search history.

(56) References Cited

U.S. PATENT DOCUMENTS

| | | | | |
|---|---|---|---|---|
| 9,021,459 | B1 * | 4/2015 | Qu | G06F 11/1484 710/33 |
| 11,409,468 | B2 | 8/2022 | Muthiah | |
| 11,409,568 | B2 * | 8/2022 | Jiang | G06F 9/5038 |
| 2014/0189677 | A1 * | 7/2014 | Curzi | G06F 8/65 717/171 |

(Continued)

OTHER PUBLICATIONS

International Search Report and Written Opinion for PCT Application No. PCT/US2024/044506 dated Nov. 25, 2024.

(Continued)

*Primary Examiner* — Wissam Rashid
(74) *Attorney, Agent, or Firm* — Mughal Gaudry & Franklin PC

(57) ABSTRACT

A pod hosted on a node is generated via the cloud orchestration platform. The pod is to be assigned to managing the one or more task processes corresponding to the data set. The pod is designated as a master pod. Each of one or more worker pods replicates data from the master pod. Each of the one or more worker pods is hosted on another node. An input that triggers an upgrade for the corresponding virtual machines is detected. Execution of a custom script is initiated, which triggers: polling the microservice for status information of the pod and the set of replicas; and determining whether a condition for iteration advancement for the upgrade is satisfied based on the status upgrade. An incremental advancement of the upgrade to a next virtual machine is initiated upon determining that the condition for iteration advancement for the upgrade is satisfied.

20 Claims, 8 Drawing Sheets

(56) References Cited

U.S. PATENT DOCUMENTS

2020/0241863 A1 7/2020 Duvur et al.

OTHER PUBLICATIONS

Sayfan, Gigi, "Mastering Kubernetes", May 2017, Packt Publishing Ltd., Birmingham, United Kingdom.
Vayghan, L. et al. "Microservice Based Architecture: Towards High-Availability for Stateful Application with Kubernetes", 2019 IEEE 19th International Conference on Software Quality, Reliability and Security (QRS).
Vayghan, L. et al., "A Kubernetes Controller for Managing the Availability of Elastic Microservice Based Stateful Applications", Dec. 28, 2020, Cornell University Library.

* cited by examiner

STATEFULSETS GRACEFUL TERMINATION FOR CLOUD COMPUTING PLATFORMS

CROSS-REFERENCE TO RELATED APPLICATIONS

This application claims the benefit of and priority to U.S. Provisional Application No. 63/579,683, filed on Aug. 30, 2023, which is hereby incorporated by reference in its entirety for all purposes.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

Cloud computing systems provide computing flexibility and power, in that various resources can be dynamically recruited to handle tasks. Further, cloud systems may be configured to provide replication of processing units and data storage to promote performance stability. The underlying structure of cloud systems can include many more resource units contributing to the system's performance. Therefore, due to the size of a cloud system and the replication structure, monitoring the collective system and ensuring that the various resource units are performing properly and in accordance with recent upgrades can be challenging.

SUMMARY

In some embodiments, a method is provided that includes: identifying, using a cloud orchestration platform, a data set that is to be associated with a given client, wherein the data set corresponds to one or more task processes associated with a microservice; accessing a pod generated via the cloud orchestration platform calling a container orchestration platform, wherein the pod is to be assigned to managing the one or more task processes corresponding to the data set, wherein the pod corresponds to a code-execution unit, wherein the pod is designated as a master pod, and wherein each of one or more worker pods replicates data from the master pod; detecting that an input triggers an upgrade for at least part of the pod and the set of replicas has been received; and in response to detecting the trigger: interrupting a default pod-replacement protocol of the container orchestration platform by transmitting a custom script, from the cloud orchestration platform to the container orchestration platform, wherein the custom script includes instructions for the container orchestration platform to: poll the microservice for status information of the pod and the set of replicas; and determine whether a condition for iteration advancement for the upgrade is satisfied based on the status upgrade; and initiating an incremental advancement of the upgrade to a next pod or replica upon determining that the condition for iteration advancement for the upgrade is satisfied.

The condition for iteration advancement may be defined to indicate an order in which the pod and the set of replicas are to be upgraded, and wherein the order may indicate that each of the one or more worker pods is to be upgraded before the master pod.

The instructions further may indicate that the container orchestration platform is to: repeatedly poll the microservice for status information of a state of the microservice until a response has been received that indicates completion of the upgrade to a first pod; and after detecting a response that indicates completion of the upgrade to the first pod, repeatedly poll the microservice for status information of a state of the microservice until a response has been received that indicates completion of the upgrade to a second pod.

In some embodiments, a method is provided that includes: identifying, using a cloud orchestration platform, a data set that is to be associated with a given client, wherein the data set corresponds to one or more task processes associated with a microservice; accessing a pod generated via the cloud orchestration platform by calling a container orchestration platform, wherein the pod is to be assigned to managing the one or more task processes corresponding to the data set, wherein the pod corresponds to a code-execution unit, wherein the pod is designated as a master pod, and wherein each of one or more worker pods replicates data from the master pod; detecting that an input triggers an upgrade for at least part of the pod and the set of replicas has been received; and in response to detecting the trigger: interrupting a default pod-replacement protocol of the container orchestration platform by transmitting a custom script, from the cloud orchestration platform to the container orchestration platform, wherein the custom script includes specifications for the container orchestration platform to: poll the microservice for status information of the pod and the set of replicas; and determine whether a condition for iteration advancement for the upgrade is satisfied based on the status upgrade; and initiating an incremental advancement of the upgrade to a next pod or replica upon determining that the condition for iteration advancement for the upgrade is satisfied.

The condition for iteration advancement may be defined to indicate an order in which the pod and the set of replicas are to be upgraded, and wherein the order indicates that each of the one or more worker pods is to be upgraded before the master pod. The specifications may further indicate that the container orchestration platform is to: repeatedly poll the microservice for status information of a state of the microservice until a response has been received that indicates completion of the upgrade to a first pod; and after detecting a response that indicates completion of the upgrade to the first pod, repeatedly poll the microservice for status information of a state of the microservice until a response has been received that indicates completion of the upgrade to a second pod. Detecting that the input triggers the upgrade may include detecting that a Microservice-specific condition is satisfied. Detecting that the input triggers the upgrade may include detecting that a deleted pod has been replaced. Detecting that the input triggers the upgrade may include detecting that a deleted stateful application has been reconciled.

In some embodiments, a method includes: identifying, using a cloud orchestration platform, a data set that is to be associated with a given client, wherein the data set corresponds to one or more task processes associated with a microservice; accessing a pod generated via the cloud orchestration platform calling a container orchestration platform, wherein the pod is hosted on a node deployed on a corresponding virtual machine, wherein the pod is to be assigned to managing the one or more task processes corresponding to the data set, wherein the pod and each replica of the set of replicas corresponds to a code-execution unit, wherein the pod is designated as a master pod, wherein each of one or more worker pods replicates data from the master pod, and wherein each of the one or more worker pods is hosted on another node deployed on another corresponding virtual machine; detecting that an input triggers an upgrade for the corresponding virtual machines; in response to detecting the trigger: initiating execution of a custom script that includes instructions for the container orchestration platform to: poll the microservice for status information of the pod and the set of replicas; and determine whether a condition for iteration advancement for the upgrade is satisfied based on the status upgrade; and initiating an incremental advancement of the upgrade to a next virtual machine upon determining that the condition for iteration advancement for the upgrade is satisfied.

The condition for iteration advancement may be defined to indicate an order in which the corresponding virtual machines are to be upgraded, and wherein the order indicates that each of the corresponding virtual machines associated with the one or more worker pods is to be upgraded before a corresponding virtual machine that is associated the master pod.

The instructions may further indicate that the container orchestration platform is to: repeatedly poll the microservice for status information of a state of the microservice until a response has been received that indicates completion of the upgrade to a first virtual machine of the corresponding virtual machines; and after detecting a response that indicates completion of the upgrade to the first pod, repeatedly poll the microservice for status information of a state of the microservice until a response has been received that indicates completion of the upgrade to a second virtual machine of the corresponding virtual machines.

In some embodiments, a system is provided that includes one or more data processors and a non-transitory computer-readable storage medium containing instructions which, when executed on the one or more data processors, cause the system to perform part or all of one or more methods disclosed herein.

In some embodiments, a computer-program product tangibly embodied in a non-transitory machine-readable storage medium, including instructions configured to cause a computing system to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Cloud Computing System and Containers

Figure 1:
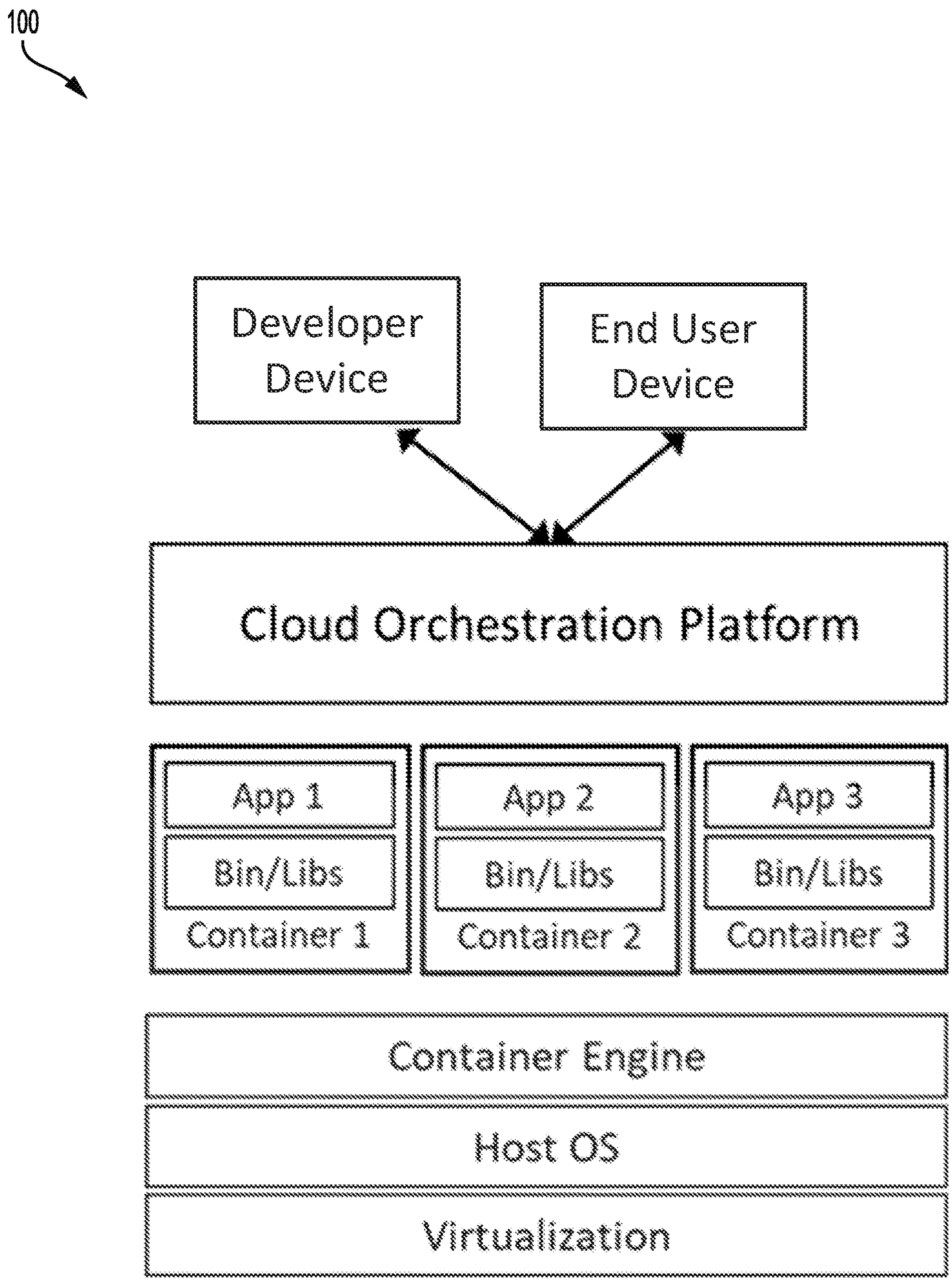
FIG. 1 illustrates an exemplary cloud-computing system configured with various containers.

FIG. 1 illustrates a cloud-computing system 100 configured with various containers. The cloud-computing system 100 is configured to allocate specific resources to various clients (or developers) to support running applications of the client. Execution of the application can entail communicating with various end user devices.

Cloud computing refers to hosted services that are delivered over the Internet. These services are provided through a cluster of servers, databases, software, and analytics engines that reside in a network commonly referred to as cloud. This allows different applications to coexist and share the resources on the same cluster of computers. When an application demands resources such as servers, storage, and networking or processing power, the system dynamically allocates the resources based on the requirements of different applications. Thus, over time, cloud resources are shared among several applications and their users, which results in efficient resource usage. Further, a cloud system provides flexibility to clients, so as to support dynamic expansion or reduction in cloud resources that are available.

The cloud system uses "virtualization technology" to create virtual versions of physical resources. Virtualization, which generates virtual machines (VMs) by abstracting physical hardware resources, is a core function of a cloud system. For instance, a single physical server is split into multiple virtual servers, each running its own set of applications. This helps to use resources efficiently. When an application needs more computing power or memory or both, the cloud system allocates additional resources to the application. To put an application in the cloud, it is packaged with all its required files, settings, and dependencies and then uploaded to a cloud system. The cloud infrastructure implements the virtual environment and ensures that applications run with the intended quality of service requirements.

In a cloud system, containers are used to package each application and all resources it needs. For example, each container may package an application and corresponding binaries and libraries files (in a Bins/Libs layer). These containers are portable, meaning they can run on different machines. Containers virtualize the operating system and are operated from a private data center, the public cloud or even on a developer's personal laptop. Each client's application is packaged into its own container, such that if the applications are running on the same physical computer, they would not interfere with the operations of one another. Containers ensure that every application gets the exact environment that it needs to run in a seamless manner. This helps avoiding conflicts between different applications that might have different settings.

This logical packaging decouples applications from their runtime environments, allowing for simple and consistent deployment regardless of the target execution environments. Containers also isolate software from its underlying infrastructure, encapsulating dependencies and isolating them within a secure environment. Applications are regularly deployed across several environments using popular container engines such as Docker that simplifies cloud migration by taking advantage of automation features via APIs that are provided by container engines or orchestrators.

Container management platforms, namely container orchestration platforms (or "orchestrators"), are required to manage a large set of containers. Orchestrators, such as Kubernetes, manage containers by load balancing, which enables containerized applications to execute with an agreed quality of service contract between a containerized application and the cloud system.

The cloud system defines its operation through service models such as Infrastructure as a Service (IaaS), Platform as a Service (PaaS), and Software as a Service (SaaS). These models outline the extent of control that is exerted by cloud providers and application owners over the underlying infrastructure and software stack. The resources of a cloud infrastructure, such as physical servers, storage devices, and networking components are abstracted into virtual machines (VMs) or containers, which provide isolated environments for running applications so that crash or compromise of one application does not create operational hazard and security hazards for other applications.

A cloud or distributed system operates by leveraging the virtualization and network technologies to efficiently manage the deployment and management of applications. This approach allows organizations to scale their applications and services dynamically to meet varying demands, while also improving resource utilization and reliability. Deployment of applications in a cloud environment involves creating virtual instances of servers and configuring them to host the required software stack. This is achieved through Infrastructure as Code (IaC) tools, such as Terraform or CloudFormation, that allow developers to define the desired infrastructure configurations using a scripting code. Once defined, these configurations are versioned, shared, and replicated, ensuring consistency across different environments.

To manage applications effectively, cloud systems offer tools for monitoring, scaling, and orchestration. Monitoring tools collect performance metrics, logs, and other data from running instances of containerized applications, providing insights into the health and performance of the applications. This data helps application designers and operators to identify bottlenecks, troubleshoot issues, and optimize resource allocation. Orchestration tools like Kubernetes have become integral to managing distributed systems. Kubernetes automates deployment, scaling, and management of containerized applications. It abstracts away the complexities of managing individual instances by grouping them into pods which are managed units. Kubernetes also provides features like service discovery, load balancing, and rolling upgrades, ensuring high availability, and minimizing downtime.

Exemplary Orchestrator

Figure 2:
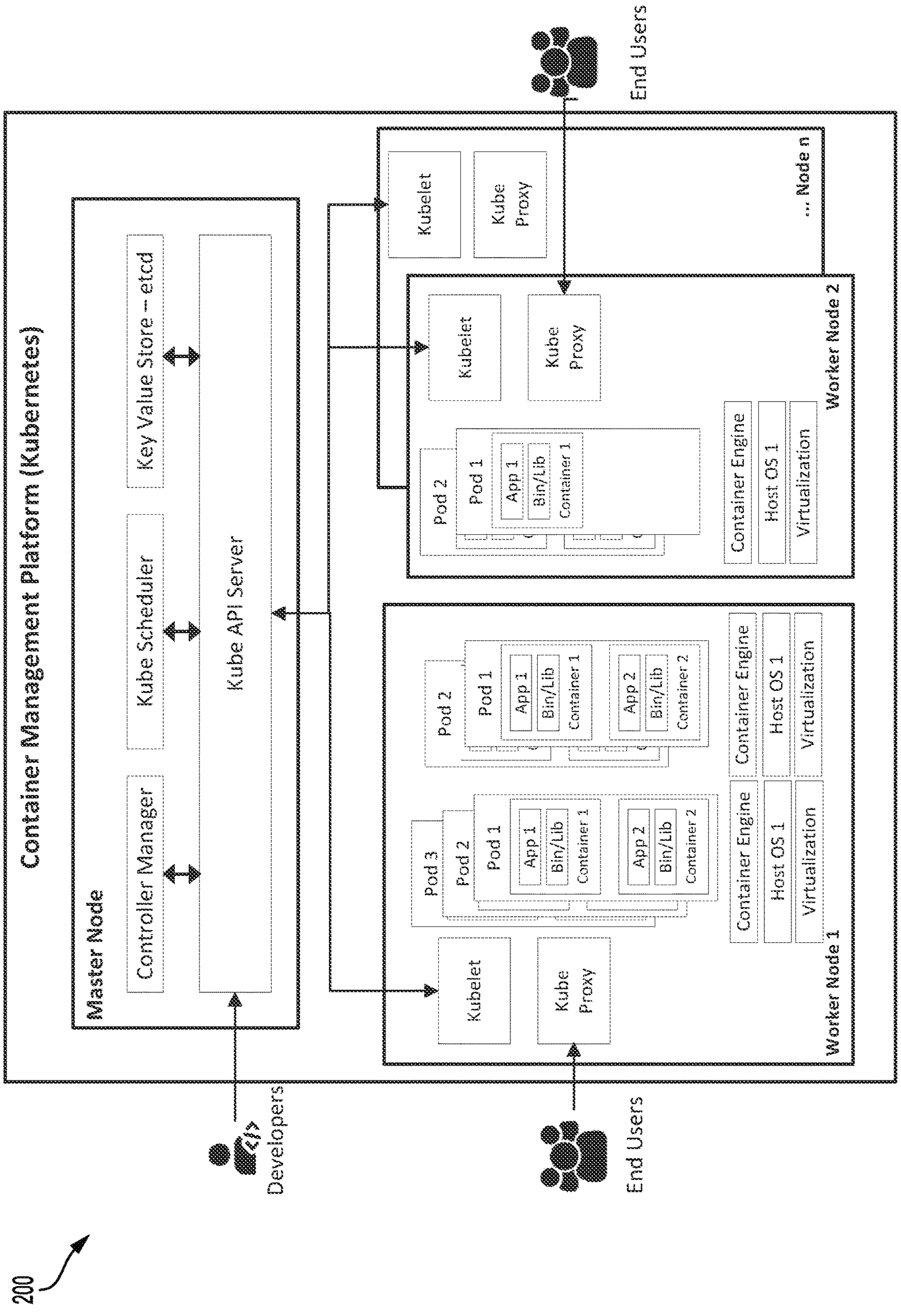
FIG. 2 illustrates an exemplary architecture for container orchestration platform designed for efficiently managing containers, where the platform is configured to create, automate and configure pods that are collections of one or more containers.

FIG. 2 illustrates an exemplary architecture for container orchestration platform (e.g., Kubernetes) designed for efficiently managing containers, where the platform is configured to create, automate and configure pods that are collections of one or more containers. Pods form the fundamental units of deployment in the container orchestration platform. These collections of one or more containers share storage and networking resources while they are executing in the same environment. Pods include containers for startup processes and, if supported, ephemeral containers for debugging applications in addition to the application containers. Pods are transient entities that remain on the execution nodes until their execution is complete, or until resource shortages or node failures force their premature termination or eviction. A pod has a single filesystem and an IP address; Kubernetes schedules all containers for a given pod on the same host, with the same network namespace, so all of them have the same IP address and are reachable via a local host.

Nodes in an orchestrator cluster are physical or virtual machines that may run inside containers. Each node, which is managed by the control plane, delivers critical services to pods. In the Kubernetes platform, services such as kubelet are used to manage a container's execution through the container engine (like Docker). Further, kube-proxy are used to manage networking rules for an effective service IP routing, to orchestrate the placement of containers into pods on nodes. Nodes host numerous pods, each consisting of multiple containers. To have an effective node identification and administration, and to remove discrepancies, naming conventions are followed to identify a node. Two nodes cannot share the same name at the same time. In addition, it may be assumed that a resource with the same name is the same object. It may be implied that in the case of a node that has an instance with the same name will also have the same state and characteristics as that of the node labels. If an instance is modified without updating its name, this may result in inconsistencies.

The containers are maintained by controllers, such as a replication controller that prioritizes and checks that the necessary number of pod replicas are present. The container management platform uses pods that enable management of many containers through a single interface, to thereby deliver a high degree of software encapsulation. Networking and filesystem services are supplied at the pod level, allowing for effective resource management. Labels and replication controllers identify and manage containers or pods to provide better control over the behavior of an application.

To allow for redundancy to the users of running applications, one approach is to have more than one instance or pods running at the same time. Then, if one pod fails, the application is still running on another pod. The replication controller coordinates running multiple instances of a single pod in the cluster for providing high availability. It further monitors whether a certain number of pod replicas are active and replacing any failed pods. Further, the replication controller handles pod scalability, terminating redundant instances and establishing new ones as needed. If multiple pods are not in use, it is the responsibility of replication controller to terminate the unused pods. If a number of pods is not sufficient for running an application, the replication controller is also responsible for creating new pods. Replication controller also creates multiple pods to share the load across them. For example, if a single pod is serving a relatively large number of users and their count continues to increase, then a new pod is deployed to balance the workload between the two pods. If the demand keeps increasing, and the resources are exhausted on the first node, additional pods may also be deployed on other nodes in a cluster as well.

A StatefulSet represents a set of pods that perform stateful operations. Each pod in the StatefulSet has a unique and persistent identifier and a stable hostname. A StatefulSet controller can track, for each pod in a StatefulSet, a state of the pod. The state can be used to monitor operation of the set of pods, facilitate routing of tasks, etc. The StatefulSet controller can enforce properties of uniqueness and ordering among instances of a pod and run, manage and scale applications. The StatefulSet controller can be designed to work with applications that require stable network identifiers and persistent storage, and the controller can guarantee an order of deployment and scaling of pods, as well as ensuring that each pod has a unique identity. For example, the StatefulSet controller can assign a sticky identity (e.g., an ordinary number beginning with zero) to each pod instead of assigning random IDs to each replica pod. A new pod can be created by cloning the data of an existing pod. If the existing pod is in a pending state, then the new pod is not created. The controller can set the first pod as a primary pod and the other pods are replicas. A primary pod handles both read and write requests from a user; while replicas must always synchronize with the primary pod to do data replication. If a pod is destroyed, a new pod is created with the same name; and the persistent volume is attached with the pod.

Microservices Supported in Cloud Computing Systems

A cloud computing system can support applications provided by various types of microservices. Thus, the cloud computing system can provide resources (that may be contained within one or more containers and/or flexibly scaled) that can be allocated to support a microservice and to facilitate communications between the microservice and end users. Exemplary microservices include Kafka, Redis, and OpenSearch.

Kafka in a Cloud System

Figure 3:
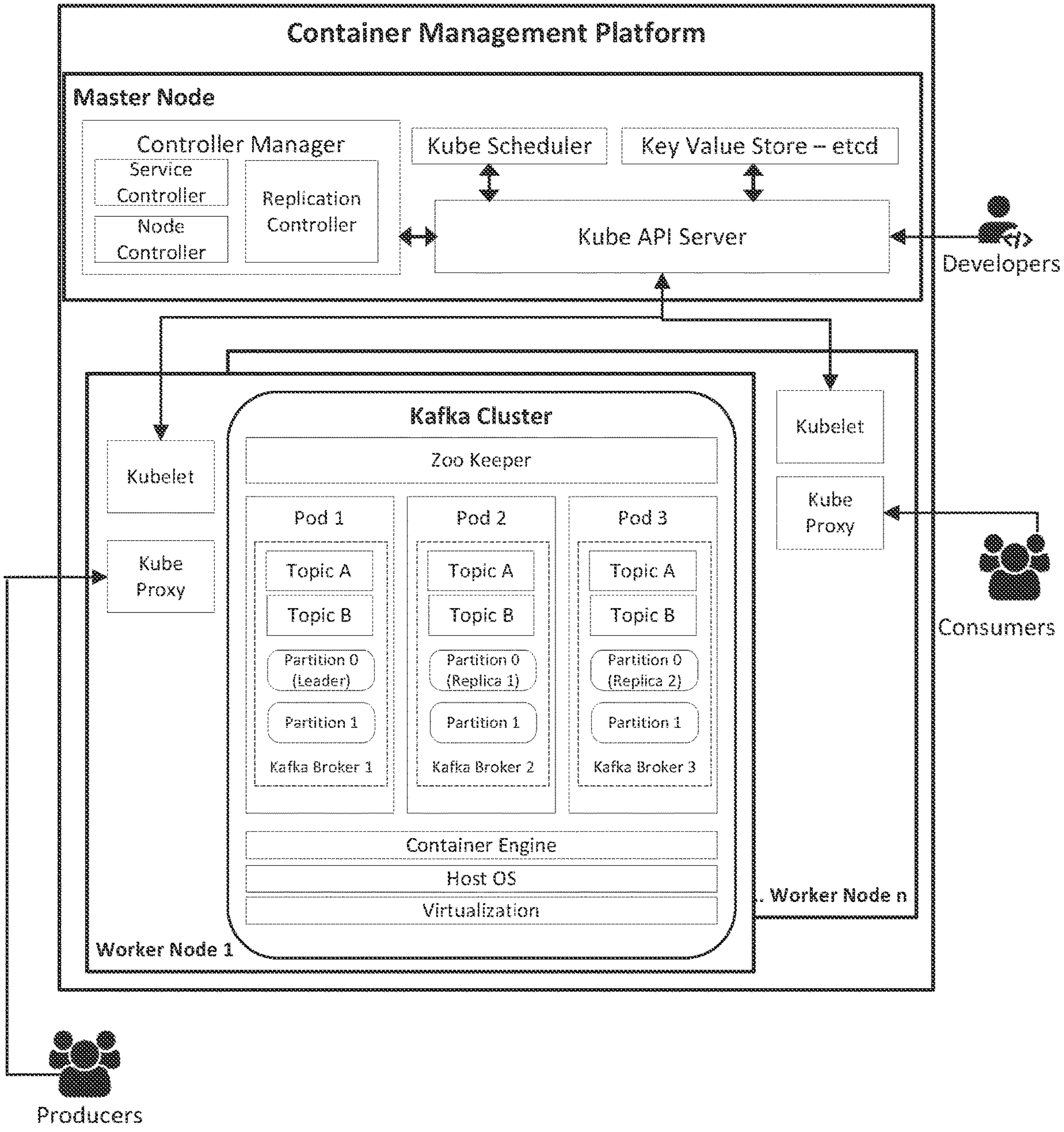
FIG. 3 illustrates an exemplary system where a container management platform facilitates upgrades of partitions in a Kafka cluster.

Kafka is a distributed streaming platform designed to manage data streams that are high-throughput, fault-tolerant, and real-time. It gathers incoming data streams from different sources like apps, IoT devices, and sensors. The data streams are divided into categories called topics and then split into smaller segments known as partitions. The partitions are copied across different brokers, and within each partition, multiple readers simultaneously access the data. Partitions are allocated to several brokers. Kafka relies on brokers to handle tasks like storing and distributing data. Each individual server in a Kafka cluster is called a broker, but usually, a group of brokers forms a Kafka cluster. One of these brokers, the controller, takes charge and manages activities such as assigning partitions to other brokers and overseeing issues like failures and downtime. (See FIG. 3) A broker oversees ingesting messages from clients that share the information and saves them to the storage. When consumers request these messages, brokers retrieve them from the partitions. Brokers are spread out across different computers or virtual machines in a cloud system, so as to boost the system's ability to handle problems and efficiently and effectively manage traffic growth. Kafka uses a publish-subscribe model to send invitations (producers) and receive guests (consumers). Producers send data to specific topics and consumers subscribe to these topics to receive the data. Consequently, producers and consumers are kept separate and isolated. Subsequently, Kafka adds more brokers once the load is increased and distributes work among them. This strategy increases the capability of a Kafka cluster to handle even larger data loads and maintain high throughput.

OpenSearch in a Cloud System:

OpenSearch is a distributed search and analytics engine designed to analyze and search information in big data volumes. It operates using nodes that are deployed across servers or virtual machines that form clusters that collaborate to manage and process data. Data within an OpenSearch index grows exponentially, so it is divided into shards to manage it effectively. An optimal shard count is important to enhance performance, and its planning is recommended in advance. Distributing data across multiple machines not only makes its management simpler but also minimizes associated risks. Query speed improves when queries are run in parallel across different shards, but this relies on having each shard on a distinct node within the cluster. Shards consume memory and disk space that affect queries and indexing requests. Balancing the shard count is key to preventing slowdowns. The two shard types are primary shards and replica shards. Replicas provide fault tolerance; if a node fails, the replica of another node takes over to ensure data availability.

Primary and replica shards have differing behaviors. Both handle queries and indexing requests must pass through primary shards before reaching replicas. As a result, if a primary shard fails, a replica takes over. Replicas also consume resources and impact performance, but the number of replicas is reduced or enhanced after continuously reviewing the requirements in real time. Replicas are placed on separate nodes from primary shards to ensure redundancy. A system supporting n replicas requires at least n+1 nodes. The horizontal scaling of OpenSearch involves adding nodes to handle larger datasets and queries effectively.

Redis in a Cloud/Distributed System:

Redis functions as an in-memory data repository that is utilized for tasks like caching and real-time analysis in high-performance scenarios. In cloud or distributed setups, Redis serves as a cache for frequently accessed data, thereby alleviating the load on databases and enhancing the speed of applications. In distributed environments, Redis is implemented on a cluster of several nodes or instances that allows data distribution and access from different system segments.

Redis uses a master-slave replication model, where the primary data is stored on a master node, and redundant copies are maintained on slave nodes to facilitate data reading that eventually boosts scalability. If a master node fails, a slave node is promoted to replace it. It is possible to designate specific nodes for reading or writing tasks. It is suggested to execute write queries on the master node and direct read queries to the slave servers. In Redis, a master node replicates data across one or more slave servers asynchronously. All slave servers hold the most up-to-date data changes that are made on a master server. If a slave server experiences outages, another slave server steps in to handle client requests. Redis also supports clustering, which involves sharding data across multiple master nodes. This approach enhances both performance and availability and enables horizontal scaling of the system.

Replication in Cloud Computing Systems

Data replication is a process of creating multiple copies of data and storing them at various locations on a server or clusters of servers. Data replication in a distributed system distributes data from a source server to other servers. These copies, also referred to as replicas, are synchronized with the source data such that each user accesses its relevant data without making any bottlenecks for other users. Replicas provide a backup in case of a fault occurrence and improve the satisfaction of customers by making the distributed data system fault tolerant by providing network wide accessibility.

By keeping data geographically closer to a consumer, replication helps to reduce the latency of executing a data query. Similarly, by distributing data and services across multiple nodes, replication enables parallel processing and load balancing. For instance, CDNs (Content Delivery networks) often store the data close to the location of a user. Replication is used to create read-only copies of data that remain accessible in the offline mode even if the primary system is experiencing high load or it becomes temporarily unavailable. Replication allows different nodes to serve different types of requests by separating read and write operations. This leads to better concurrency control, as write operations are isolated and concentrated on a single node; while read operations are distributed across multiple nodes. Replication prevents single points of failure by replicating critical components across multiple nodes. This ensures system integrity and performance. However, there is a tradeoff between consistency and availability of data in replication. It allows opting between strong consistency (synchronous replication) or greater availability and performance (asynchronous replication) based on the requirements of an application.

Different models are used for implementing data replication such as transactional replication, state machine, single leader replication etc. For instance, a single leader replication is used in a distributed messaging platform that enables users to send and receive messages in real-time. These systems require high availability, fault tolerance, and efficient message distribution. The messaging system design includes a master node, often referred to as the leader or master broker. This master node is responsible for managing message distribution, handling write operations, and maintaining data consistency. The messaging system consists of multiple nodes or brokers distributed across different regions. The master node is responsible for maintaining the authoritative copy of messages. When a user sends a message, the request is directed to the master node. The master node processes the write operation, acknowledging its receipt, and ensures that the message is stored in its local storage. The master node replicates incoming messages to follower nodes or slave brokers that are in different regions. These follower nodes maintain copies of the messages for read operations. The master node might employ synchronous replication for critical messages. It waits for acknowledgments from a predefined number of follower nodes before confirming the write operation. This ensures that the messages are consistently stored across nodes.

Replicating pods across a cluster poses complex problems. For example, data consistency can be affected considerably, since the replicated pods frequently use shared databases or data sources. Also, synchronizing data upgrades across replicas may result in errors owing to replication delays or concurrent changes. When applications are configured to maintain various states, this challenge gets more difficult, potentially leading to complications during scaling events or failovers. Further, coordinating network communication between replicated pods is difficult, as network congestion and latency influence the stability and performance of an application.

Additionally, managing resource allocation is important, as replicated pods use resources such as CPU and memory, causing performance degradation if not managed efficiently. Another issue with replication is that the load distribution among pods may be not equal, potentially overloading certain replicates while underutilizing others, thereby resulting in sub-optimal resource usage. The complexity is further increased as ensuring atomic operations across replicated pods and dealing with configuration management is important to provide consistent operations. Moreover, managing fault isolation becomes challenging since identifying and isolating faulty replicas while maintaining system stability necessitates careful planning. Further, scaling applications with replication may cause transient inconsistencies or performance concerns until the system stabilizes.

Challenges of Upgrades in Replicated System

At various points in time, the cloud computing platform and/or container-orchestration platform coordinates upgrades, which may occur (for example) in response to instructions from a developer, to improve security, etc. During an upgrade, each pod in a cluster can be deleted, and a corresponding new pod (that is assigned a same name as the deleted pod) is generated, where the new pod is configured with the upgrade. During the upgrade, the pod being replaced and the new pod are unavailable to handle tasks. Upgrades can present multiple challenges.

For example, a standard approach for performing an upgrade using a container orchestration platform (e.g., Kubernetes) is to use a normal statefulset RollingUpdate. The rolling update technique refreshes images, configurations, labels, annotations, and resource specifications within specific clusters. This method gradually swaps the resources of existing Pods with the new ones, which are then scheduled on nodes that have available resources. Rolling updates are specifically designed to update workloads without causing any interruptions to the execution of applications. Developers introduce new versions at any time, and users continue using the application simultaneously. If a Deployment is accessible to the public, the associated Service selectively distributes traffic to the Pods that are operational during an update process. An operational Pod is one that is accessible to users of the application.

This technique relies heavily on periodic health and/or status checks of pods. Removing instances of older applications happens only when the new versions are healthy with an updated status. Consequently, the existing deployment becomes a mix of old and new versions as the transition takes place. This incremental strategy allows for upgrades to be deployed while verification is happening concurrently whenever the traffic of an application increases. Additionally, this approach does not demand additional hardware or cloud setups, that makes it a cost-efficient method for upgrading.

However, following an upgrade of a replica, it may take many minutes for the overall state to then be reconciled with the cluster. During this time, data may be moved between replicas to ensure high availability of the data. In the meantime, the cluster continues to serve consumer requests, but the limited replication may result in degraded performance. The limited replication and/or degraded performance may result in an alert being triggered, which may result in an operator (e.g., a human operator) of a cloud system or cloud orchestration platform and deciding to adjust pods assigned to a cluster and/or roles of pods. For example, such an alert may be triggered if an alert condition is defined based on Kafka UnderReplicatedPartitions.

The rolling update technique does not consider whether a cluster-wide state is up to date. As the overall state of the Microservice's persistent data across replicas is not tracked during an update. For example, a cluster-wide state may identify a quantity of pods within a cluster, but it does not track whether the data owned by each pod has been fully replicated or updated. This is due (at least in part) to the fact that retrieving this type of data requires communicating with third-party systems (e.g., a microservice system) using an API and/or commands. For example, exemplary APIs or commands that can be used to interrogate various microservices include:

kafka: kafka-topics --describe --under-min-isr-partitions opensearch: http://0.0.0.0:9200/_cluster/health If a cluster-wide state is not considered, multiple problems can result. For example, performance and/or availability of cloud resources may be degraded.

Graceful Upgrades

In some embodiments, upgrades are handled by the cloud orchestration platform deploying custom script to the container orchestration platform, where the custom script includes a job (e.g., a Kubernetes Job, Kubernetes Pods) with instructions as to how the upgrade is to be performed. The custom script may identify a condition (which may be a multi-part condition) that is to be satisfied before an upgrade process advances (e.g., to a next node). The custom script may be configured such that the condition is implemented as a hook (e.g., PostUpgrade and PreUpgrade hooks). The custom script can include an executable docker container. The job may be configured to run after or immediately after a helm update. Kubernetes Pods can be used to upgrade all the third-party software in parallel to optimize the total upgrade window.

The script may indicate that, to trigger an advancement of the upgrade process, (1) a replacement of a deleted pod with an upgraded node is to have occurred; and (2) a stateful application is to have been reconciled. Thus, the condition may be configured to detect a Microservice-specific condition, such as persistent data being fully replicated' to advance the upgrade.

The custom script may be included in a configuration file, such as a bash or Python script, that is deployed by the cloud orchestration platform on the container orchestration platform. The condition identified in the script may relate to information that is not (by default or design) available to the cloud orchestration platform. Rather, the information may relate to information that is availed to a third-party service (e.g., a microservice). The information may relate to statuses of pods in a StatefulSet (or other group of pods).

In some instances, an upgrade process may be configured to iteratively upgrade software in a set of pods. The custom script may identify one or more specific indicators that are used to evaluate whether a microservice-wide state is up-to-date after a single pod is updated, where detection of such status triggers an upgrade of a second pod to commence.

For example, the custom script may be configured to request the microservice-wide state in a StatefulSet or to request an indication whether the microservice's state matches a particular state (as being up to date). As another example, the custom script may be configured to request a given microservice-wide state of a StatefulSet.

The custom script may be configured in view of the architecture and/or functionality of a microservice supported by the container orchestration platform. It will therefore be appreciated that a custom script that is used to establish communication specifications between the container orchestration platform and a microservice may depend on the type of microservice (e.g., Kafka, Opensearch, Redis, etc.). Similarly, variables that the custom script indicates that the container orchestration platform are to request from a microservice may vary across types of microservices.

Because the information that is evaluated in a condition may be available to a microservice but not to the container orchestration platform, the container orchestration platform may be instructed to repeatedly call the microservice (e.g., at defined intervals) to poll pods for the specified information and return the information to the container orchestration platform. The container orchestration platform can, for each call response, evaluate the condition in view of the information and determine whether to proceed to a new iteration of the upgrade. The polling and evaluation process may commence when it is determined that the upgrade of all pods have been completed.

As mentioned above, different types of conditions for proceeding with a new iteration may apply to different types of microservices. Further, upgrade parameters may differ across microservices. For example, an order of pods upgrades and/or iteration-progression condition may depend on how various pods and/or nodes are handled by the microservice.

As an illustration, if the microservice prioritizes having a leader broker or master node at all times, it may be quick to respond to a downtime of a current leader broker or master node (during an upgrade) by assigning another node as the master node. Thus, if the first node to be upgraded is the leader broker or master node, it will be replaced with another broker or node that may send out synchronization instructions to perpetuate outdated information. Therefore, the customized code may indicate that the leader broker or master node is to be the last node that is upgraded.

As another illustration, if the microservice routinely archives snapshot data of its persistent data replicas, the customized code may poll for data indicating whether there is an attempt to archive a snapshot data for which an upgrade was most recently initiated and/or whether there is an ongoing archive of data next scheduled for the upgrade. If archival of snapshot data is in progress when the next node is being upgraded and an iteration-advancement condition has been satisfied, the condition may indicate that the iteration-advancement is to be paused until the archive is complete.

Figure 4:
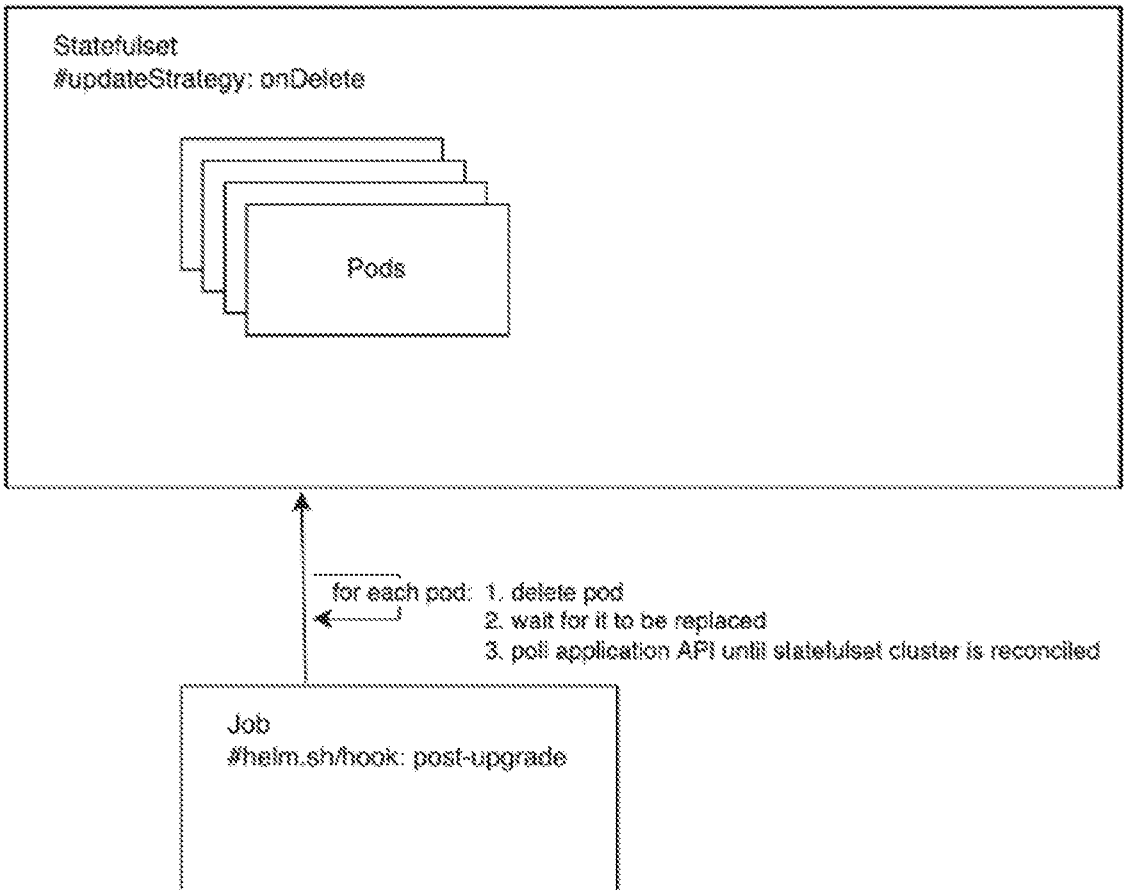
FIG. 4 shows a representation of an exemplary instance where a custom script is used by a container orchestration platform to control upgrades at a microservice level via interactions with one or more cloud systems.

FIG. 4 shows a representation of an exemplary instance where a custom script is used by a container orchestration platform to control upgrades at a microservice level via interactions with one or more cloud systems. The depicted instance includes a Statefulset with four pods. The container orchestration platform has communicated with the microservice to arrive at a multi-iteration and multi-step process (defined in a job) for advancing through an upgrading process. At each iteration in the multi-iteration and multi-step process, a pod is to be deleted, the pod is to then be replaced, and then a custom-script condition is evaluated to determine whether to advance to the next pod (if any are remaining). The custom-script condition depends on one or more states in the Statefulset cluster having reconciled with a condition specified in a custom script. Thus, a status in the Statefulset cluster is used to determine whether to advance an upgrade protocol. The status can be retrieved by polling a microservice.

Figure 5:
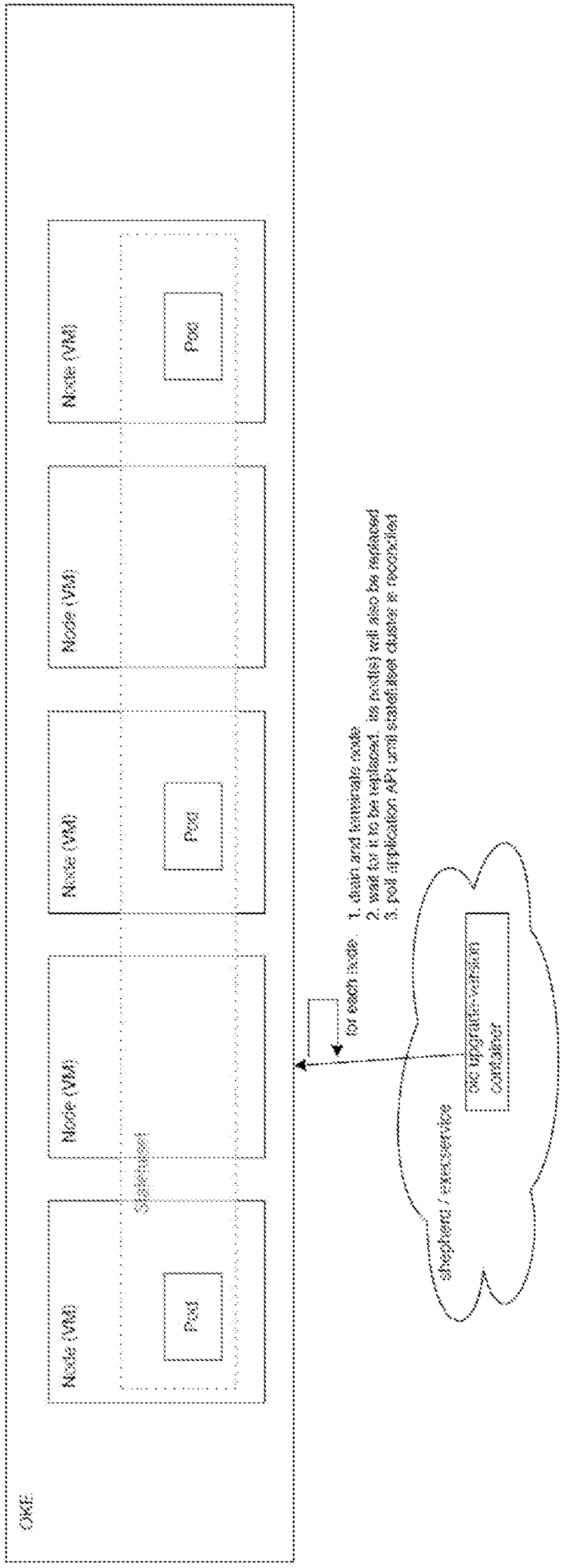
FIG. 5 illustrates an exemplary approach for iteratively upgrading pods in virtual-machine nodes.

It will be appreciated that embodiments related to graceful upgrades (e.g., where custom scripts are used to orchestrate iterations of upgrades) can be applied both with respect to upgrading software and upgrading hardware. For example, software on pods can be upgraded by replacing nodes with upgraded nodes, as described herein. Alternatively or additionally, as illustrated in FIG. 5, one or more pods in a Statefulset can be moved from one virtual machine to another, but in an iterative manner. Control of progression of the iterations can be controlled via a custom script, as disclosed herein, that identifies a given condition that indicates that a pending upgrade iteration has been completed (e.g., by polling a microservice for information regarding the same).

It will be appreciated that embodiments disclosed herein result in technical advantages of software and/or hardware upgrades being performed more quickly and reliably than other cloud-computing upgrades. Further, inconsistent handling of sequential related tasks is avoided, as is loss of data during upgrades.

Figure 6:
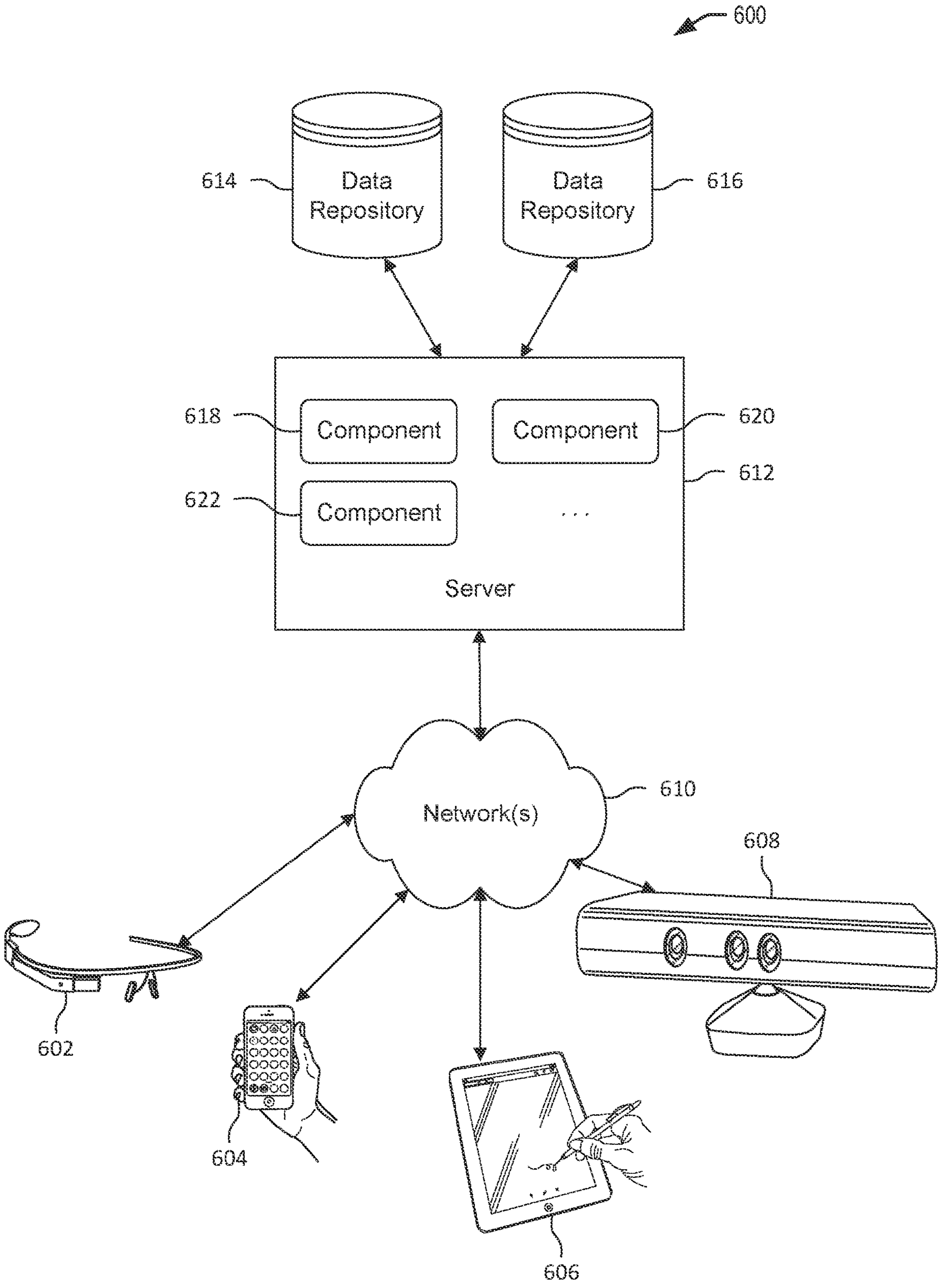
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various aspects, server 612 may be adapted to run one or more services or software applications that enable techniques for handling long text for pre-trained language models.

In certain aspects, server 612 may also provide other services or software applications that can include non-virtual and virtual environments. In some aspects, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 for techniques for handling long text for pre-trained language models in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various aspects, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain aspects. For example, one or more of the data repositories 614, 616 may be used to store information for techniques for handling long text for pre-trained language models (e.g., intent score, overall score). Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain aspects, a data repository used by server 612 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 614, 616 may also be used by applications to store application data. The data repositories used by applications may be of different types such as, for example, a key-value store repository, an object store repository, or a general storage repository supported by a file system.

Figure 7:
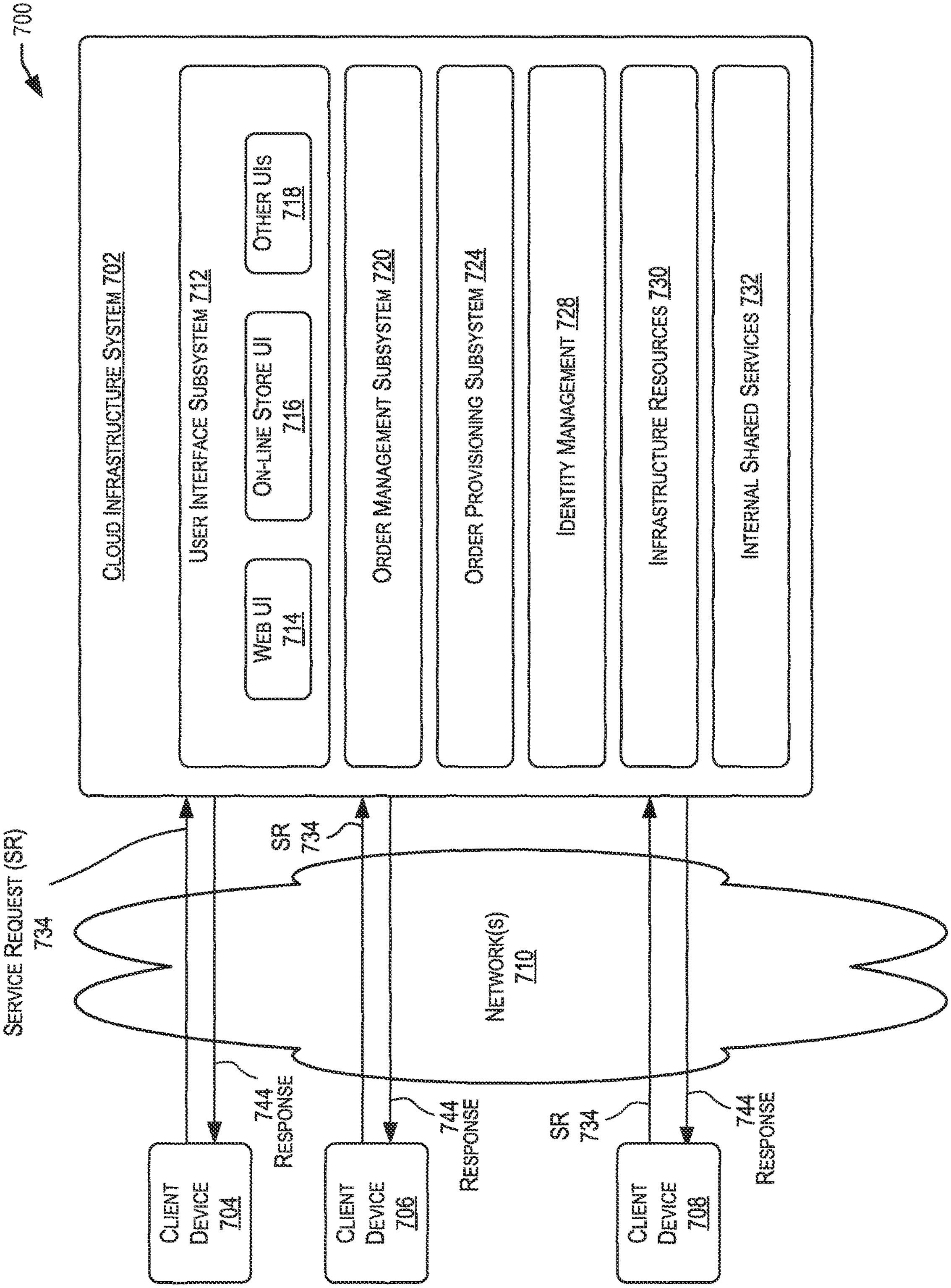
FIG. 7 is a simplified block diagram of one or more components of a system environment by which services provided by one or more components of an embodiment system may be offered as cloud services, in accordance with certain aspects.

In certain aspects, the techniques for handling long text for pre-trained language models functionalities described in this disclosure may be offered as services via a cloud environment. FIG. 7 is a simplified block diagram of a cloud-based system environment in which various text handling-related services may be offered as cloud services, in accordance with certain aspects. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the client's own on premise servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by cloud infrastructure system 702. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by cloud infrastructure system 702. Cloud infrastructure system 702 then performs processing to provide the services requested in the client's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public client, where the client can be an individual or an enterprise. In certain other aspects, under a private cloud model, cloud infrastructure system 702 may be operated within an organization (e.g., within an enterprise organization) and services provided to clients that are within the organization. For example, the clients may be various departments of an enterprise such as the Human Resources department, the Payroll department, etc. or even individuals within the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a chat bot service described in this disclosure.

In some aspects, the processing performed by cloud infrastructure system 702 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different clients, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or clients of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a client may, using a client device, request (service request 734) one or more services provided by cloud infrastructure system 702 using one or more of interfaces 714, 716, and 718. For example, a client may access the online store, browse cloud services offered by cloud infrastructure system 702, and place a subscription order for one or more services offered by cloud infrastructure system 702 that the client wishes to subscribe to. The service request may include information identifying the client and one or more services that the client desires to subscribe to. For example, a client may place a subscription order for a Chabot related service offered by cloud infrastructure system 702. As part of the order, the client may provide information identifying for input (e.g., utterances).

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the client, if not done already; receive billing and/or accounting information from the client that is to be used for billing the client for providing the requested service to the client; verify the client information; upon verification, book the order for the client; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the client order. The manner in which resources are provisioned for an order and the type of the provisioned resources may depend upon the type of cloud service that has been ordered by the client. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting client for providing the requested service.

Cloud infrastructure system 702 may send a response or notification 744 to the requesting client to indicate when the requested service is now ready for use. In some instances, information (e.g., a link) may be sent to the client that enables the client to start using and availing the benefits of the requested services.

Cloud infrastructure system 702 may provide services to multiple clients. For each client, cloud infrastructure system 702 is responsible for managing information related to one or more subscription orders received from the client, maintaining client data related to the orders, and providing the requested services to the client. Cloud infrastructure system 702 may also collect usage statistics regarding a client's use of subscribed services. For example, statistics may be collected for the amount of storage used, the amount of data transferred, the number of users, and the amount of system up time and system down time, and the like. This usage information may be used to bill the client. Billing may be done, for example, on a monthly cycle.

Cloud infrastructure system 702 may provide services to multiple clients in parallel. Cloud infrastructure system 702 may store information for these clients, including possibly proprietary information. In certain aspects, cloud infrastructure system 702 comprises an identity management subsystem (IMS) 728 that is configured to manage client's information and provide the separation of the managed information such that information related to one client is not accessible by another client. IMS 728 may be configured to provide various security-related services such as identity services, such as information access management, authentication and authorization services, services for managing client identities and roles and related capabilities, and the like.

Figure 8:
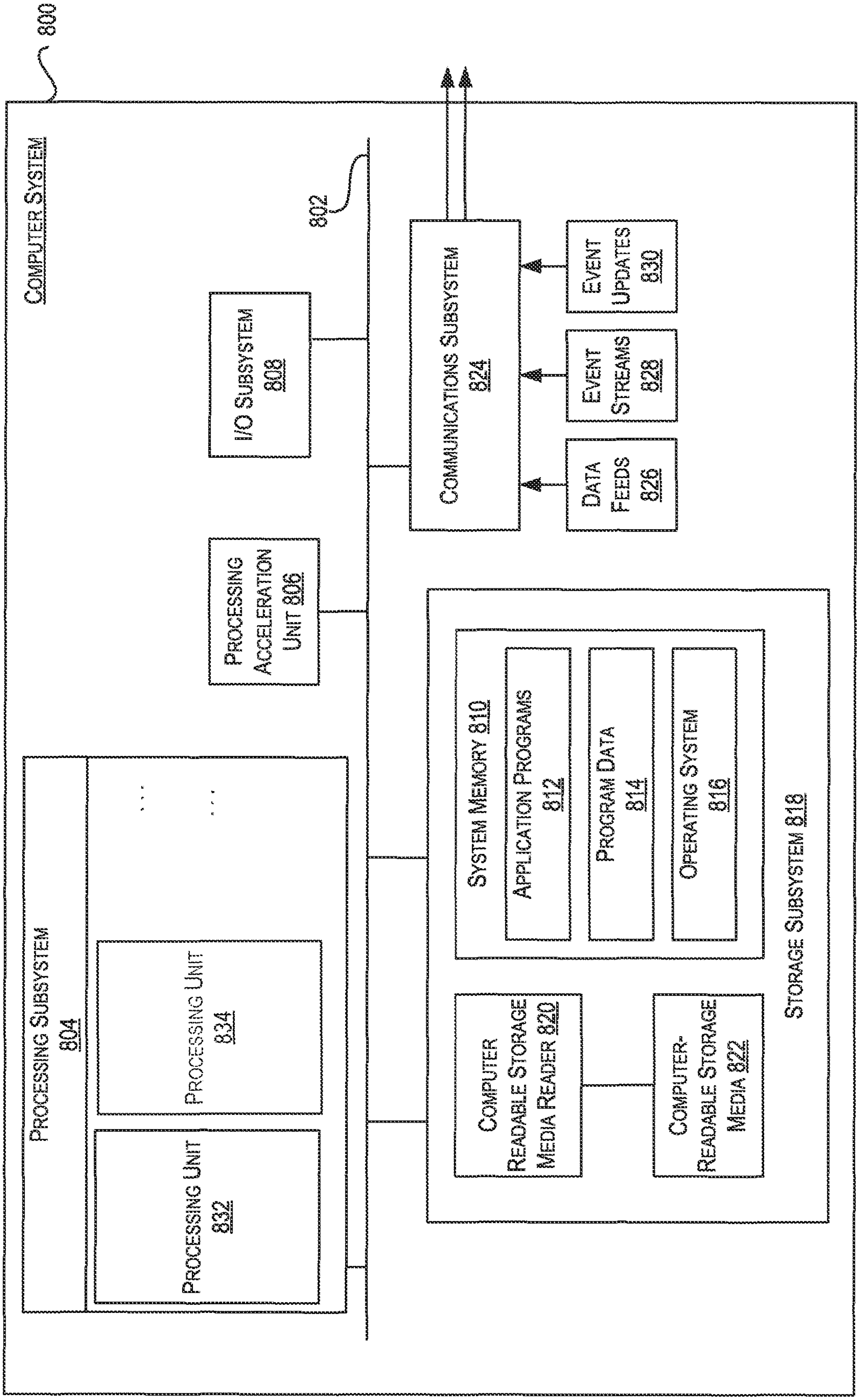
FIG. 8 illustrates an example computer system that may be used to implement certain aspects.

FIG. 8 illustrates an exemplary computer system 800 that may be used to implement certain aspects. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to transmit a response to a user regarding the inquiry for a Chabot.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed:

1. A method including:

identifying, using a cloud orchestration platform, a data set that is to be associated with a given client, wherein the data set corresponds to one or more task processes associated with a microservice;

identifying a set of pods that includes a master pod and one or more worker pods, wherein the master pod is to be assigned to managing the one or more task processes corresponding to the data set, wherein each of the set of pods corresponds to a code-execution unit and was generated via the cloud orchestration platform, and wherein each of the one or more worker pods replicates data from the master pod;

accessing the master pod by calling a container orchestration platform;

detecting that an input triggers an upgrade for at least part of the master pod and at least part of each of the one or more worker pods has been received; and in response to detecting the trigger:

interrupting a default pod-replacement protocol of the container orchestration platform by transmitting a custom script, from the cloud orchestration platform to the container orchestration platform, wherein the custom script includes specifications for the container orchestration platform to:

poll the microservice for status information of the master pod and at least one of the one or more worker pods; and determine whether a condition for iteration advancement for the upgrade is satisfied based on the status information; and initiating an iteration advancement of the upgrade to a next pod of the set of pods upon determining that the condition for iteration advancement for the upgrade is satisfied.

2. The method of claim 1, wherein the condition for iteration advancement is defined to indicate an order in which the set of pods are to be upgraded, and wherein the order indicates that each of the one or more worker pods is to be upgraded before the master pod.

3. The method of claim 1, wherein the specifications further indicate that the container orchestration platform is to:

repeatedly poll the microservice for status information of a state of the microservice until a response has been received that indicates completion of the upgrade to a first pod of the set of pods; and after detecting a response that indicates completion of the upgrade to the first pod, repeatedly poll the microservice for status information of a state of the microservice until a response has been received that indicates completion of the upgrade to a second pod of the set of pods.

4. The computer-implemented method of claim 1, wherein detecting that the input triggers the upgrade includes detecting that a Microservice-specific condition is satisfied.

5. The computer-implemented method of claim 1, wherein detecting that the input triggers the upgrade includes detecting that a deleted pod has been replaced.

6. The computer-implemented method of claim 1, wherein detecting that the input triggers the upgrade includes detecting that a deleted stateful application has been reconciled.

7. A computer-program product tangibly embodied in one or more non-transitory machine-readable storage media, including instructions configured to cause a computing system to perform a set of actions comprising:

identifying, using a cloud orchestration platform, a data set that is to be associated with a given client, wherein the data set corresponds to one or more task processes associated with a microservice;

identifying a set of pods that includes a master pod and one or more worker pods, wherein the master pod is to be assigned to managing the one or more task processes corresponding to the data set, wherein each of the set of pods corresponds to a code-execution unit and was generated via the cloud orchestration platform, and wherein each of the one or more worker pods replicates data from the master pod;

accessing the master pod by calling a container orchestration platform;

detecting that an input triggers an upgrade for at least part of the master pod and at least part of each of the one or more worker pods has been received; and in response to detecting the trigger:

interrupting a default pod-replacement protocol of the container orchestration platform by transmitting a custom script, from the cloud orchestration platform to the container orchestration platform, wherein the custom script includes specifications for the container orchestration platform to:

poll the microservice for status information of the master pod and at least one of the one or more worker pods; and determine whether a condition for iteration advancement for the upgrade is satisfied based on the status information; and initiating an iteration advancement of the upgrade to a next pod of the set of pods upon determining that the condition for iteration advancement for the upgrade is satisfied.

8. The computer-program product of claim 7, wherein detecting that the input triggers the upgrade includes detecting that a condition is satisfied, wherein the condition relates to information that is not available to the cloud orchestration platform.

9. The computer-program product of claim 7, wherein the condition for iteration advancement is defined to indicate an order in which the set of pods are to be upgraded, and wherein the order indicates that each of the one or more worker pods is to be upgraded before the master pod.

10. The computer-program product of claim 7, wherein the specifications further indicate that the container orchestration platform is to:

repeatedly poll the microservice for status information of a state of the microservice until a response has been received that indicates completion of the upgrade to a first pod of the set of pods; and after detecting a response that indicates completion of the upgrade to the first pod, repeatedly poll the microservice for status information of a state of the microservice until a response has been received that indicates completion of the upgrade to a second pod of the set of pods.

11. The computer-program product of claim 7, wherein detecting that the input triggers the upgrade includes detecting that a Microservice-specific condition is satisfied.

12. The computer-program product of claim 7, wherein detecting that the input triggers the upgrade includes detecting that a deleted pod has been replaced.

13. The computer-program product of claim 7, wherein detecting that the input triggers the upgrade includes detecting that a deleted stateful application has been reconciled.

14. A system comprising:

one or more data processors; and one or more non-transitory computer readable storage media containing instructions which, when executed on the one or more data processors, cause the system to perform a set of actions comprising:

identifying, using a cloud orchestration platform, a data set that is to be associated with a given client, wherein the data set corresponds to one or more task processes associated with a microservice;

identifying a set of pods that includes a master pod and one or more worker pods, wherein the master pod is to be assigned to managing the one or more task processes corresponding to the data set, wherein each of the set of pods corresponds to a code-execution unit and was generated via the cloud orchestration platform, and wherein each of the one or more worker pods replicates data from the master pod;

accessing the master pod by calling a container orchestration platform;

detecting that an input triggers an upgrade for at least part of the master pod and at least part of each of the one or more worker pods has been received; and in response to detecting the trigger:

interrupting a default pod-replacement protocol of the container orchestration platform by transmitting a custom script, from the cloud orchestration platform to the container orchestration platform, wherein the custom script includes specifications for the container orchestration platform to:

poll the microservice for status information of the master pod and at least one of the one or more worker pods; and determine whether a condition for iteration advancement for the upgrade is satisfied based on the status information; and initiating an iteration advancement of the upgrade to a next pod of the set of pods upon determining that the condition for iteration advancement for the upgrade is satisfied.

15. The system of claim 14, wherein detecting that the input triggers the upgrade includes detecting that a condition is satisfied, wherein the condition relates to information that is not available to the cloud orchestration platform.

16. The system of claim 14, wherein the condition for iteration advancement is defined to indicate an order in which the set of pods are to be upgraded, and wherein the order indicates that each of the one or more worker pods is to be upgraded before the master pod.

17. The system of claim 14, wherein the specifications further indicate that the container orchestration platform is to:

repeatedly poll the microservice for status information of a state of the microservice until a response has been received that indicates completion of the upgrade to a first pod of the set of pods; and after detecting a response that indicates completion of the upgrade to the first pod, repeatedly poll the microservice for status information of a state of the microservice until a response has been received that indicates completion of the upgrade to a second pod of the set of pods.

18. The system of claim 14, wherein detecting that the input triggers the upgrade includes detecting that a Microservice-specific condition is satisfied.

19. The system of claim 14, wherein detecting that the input triggers the upgrade includes detecting that a deleted pod has been replaced.

20. The system of claim 14, wherein detecting that the input triggers the upgrade includes detecting that a deleted stateful application has been reconciled.

* * * * *